Feb. 15, 1955 H. LINDLEY 2,701,944
CLEARING ATTACHMENT FOR COTTON HARVESTERS
Filed July 25, 1952 2 Sheets-Sheet 1
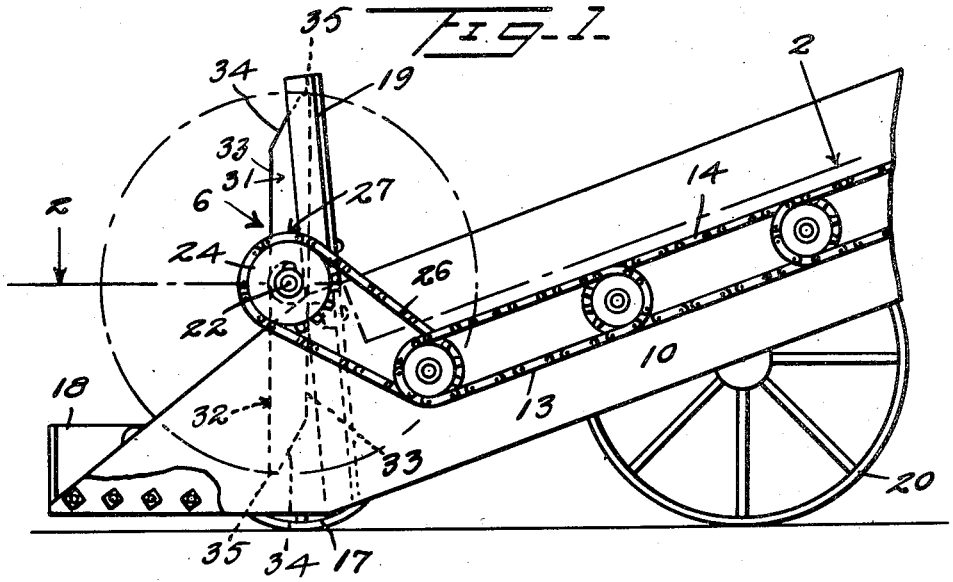
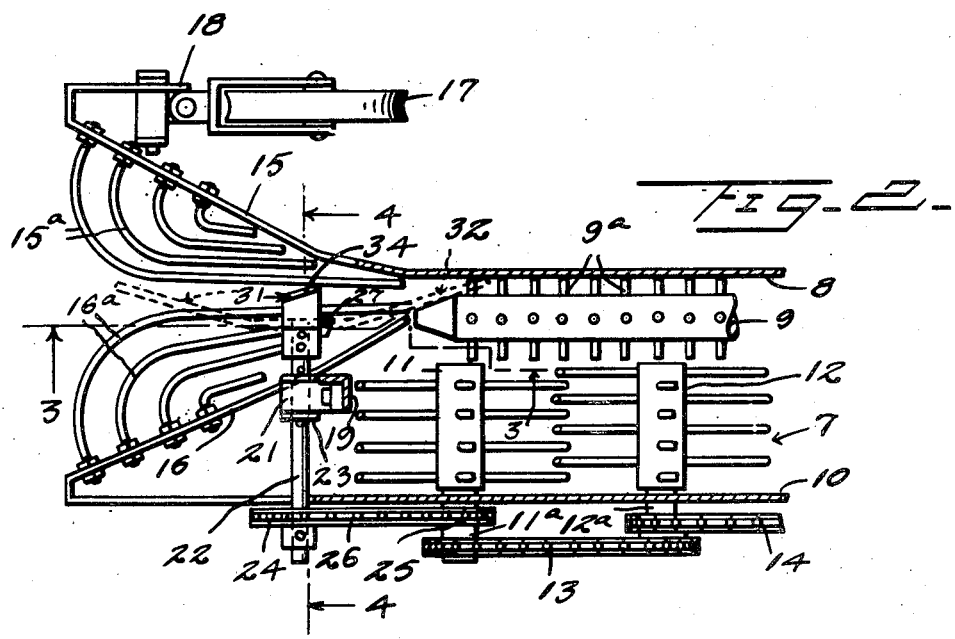
INVENTOR
*Hardie Lindley*
BY *John N. Randolph*
ATTORNEY Feb. 15, 1955 H. LINDLEY 2,701,944
CLEARING ATTACHMENT FOR COTTON HARVESTERS
Filed July 25, 1952 2 Sheets-Sheet 2
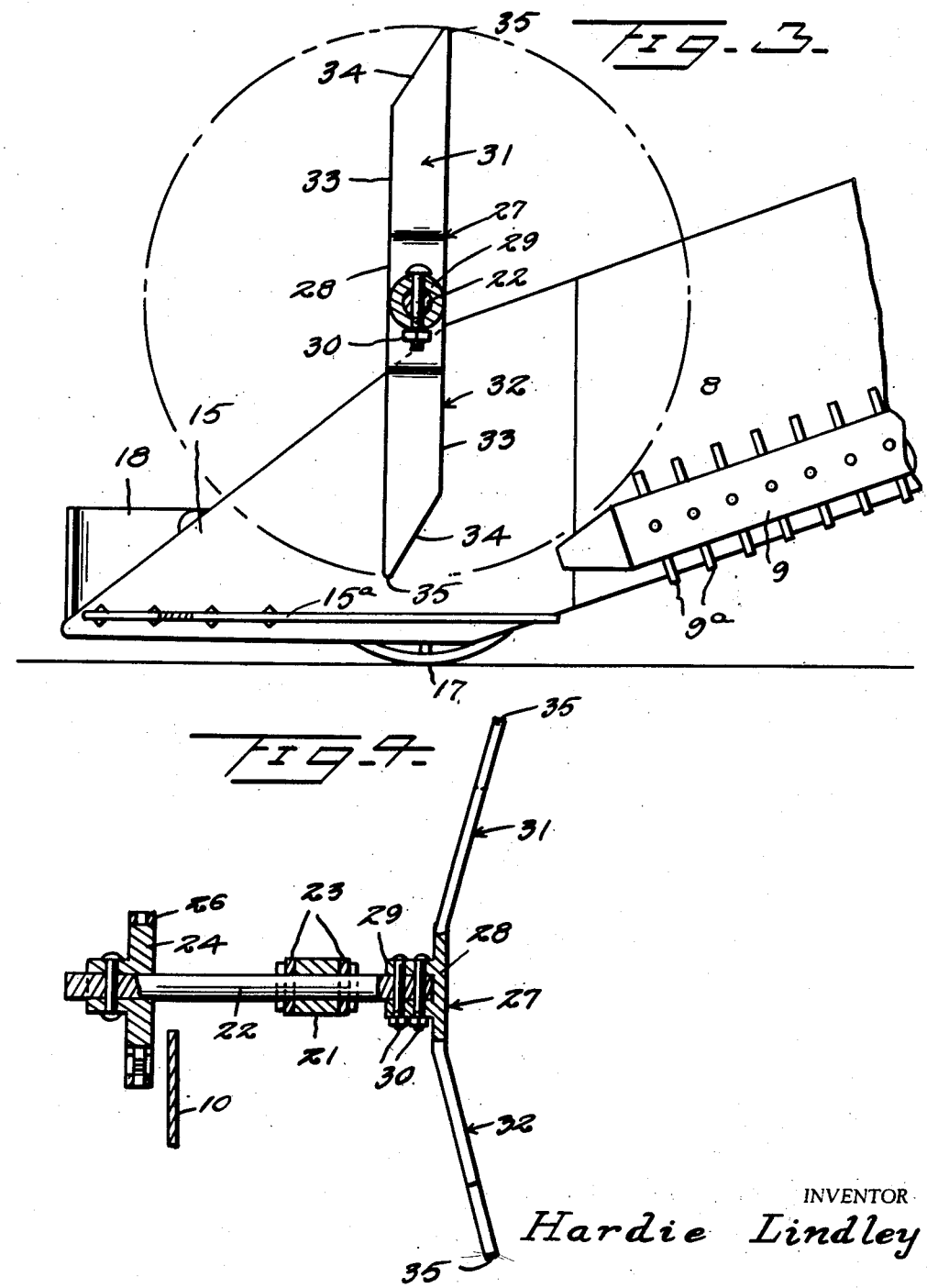
INVENTOR
Hardie Lindley
BY John N. Randolph
ATTORNEY

United States Patent Office 2,701,944
Patented Feb. 15, 1955

2,701,944

CLEARING ATTACHMENT FOR COTTON HARVESTERS

Hardie Lindley, Hobbs, N. Mex.

Application July 25, 1952, Serial No. 300,879

1 Claim. (Cl. 56—33)

This invention relates to a novel clearing attachment for a cotton harvester and more particularly for a cotton stripping machine of the type disclosed by Patent #1,950,902.

It is a primary object of the present invention to provide a clearing attachment of extremely simple construction which may be readily applied to or removed from a cotton harvester or stripper and which will effectively function to prevent seed cotton from collecting at the front of the stripper where the forward end of the stripper roll extends into and restricts the entrance throat of the stripping machine to thereby prevent such seed cotton from falling downwardly through the machine and being lost.

More particularly, it is an aim of the present invention to provide a cotton clearing attachment for cotton strippers especially intended and adapted for use in harvesting cotton on small or low cotton plants and which can be quickly removed from a harvester or stripper when larger cotton is to be harvested.

Still another object of the invention is to provide a clearing device operating adjacent the throat of a cotton stripper but which is so disposed as not to interfere with the movement of large cotton stalks through the entrance throat into the longitudinal passage of the stripper.

Various other objects and advantages of the invention will hereinafter become more fully apparent from the following description of the drawings, illustrating a presently preferred embodiment thereof, and wherein:

Figure 1 is a fragmentary side elevational view of a conventional cotton stripper showing the clearing attachment applied thereto;

Figure 2 is a horizontal sectional view thereof taken substantially along a plane as indicated by the line 2—2 of Figure 1 and showing certain of the parts of a conventional cotton stripper corresponding to that disclosed in Patent #1,950,902, aforementioned;

Figure 3 is an enlarged fragmentary vertical sectional view taken substantially along a plane as indicated by the line 3—3 of Figure 2, and Figure 4 is a transverse vertical sectional view taken substantially along a plane as indicated by the line 4—4 of Figure 2.

Referring more specifically to the drawings, for the purpose of illustrating a preferred application and use of the cotton clearing attachment, designated generally 6 and comprising the invention, a portion of a conventional cotton stripper as disclosed in Patent #1,950,902 has been illustrated in the drawings and is designated generally 7, the machine portion 7 illustrated including a side plate 8 forming a part of the stripping mechanism and which is laterally spaced from the stripping roll 9 which is rotated about its axis in a conventional manner. The machine 7 also includes an opposite outer side plate 10 through which extends the shafts of the fingered members, the forward two of which, designated 11 and 12 have been illustrated. The shaft portions 11a and 12a of the fingered members 11 and 12 which extend outwardly from the side 10 are connected by a sprocket chain drive 13 and another sprocket and chain drive 14 is connected to and extends rearwardly from the shaft 12a and is connected through other similar chain drives to a source of power. The machine is provided with forwardly flaring inner plate portions 15 and 16 formed integral with the sides 8 and 10, respectively, and defining the forwardly opening forwardly flared entrance to the cotton stripper. The plate portions 15 and 16 are provided with inwardly and rearwardly extending guide fingers 15a and 16a, respectively, forming a longitudinal entrance throat therebetween which opens into the longitudinal space between the side 8 and stripping roll 9, by means of which cotton plants are directed into said space to be engaged by the stripping fingers 9a of the stripping roll 9. The forward end of the machine 7 is supported by a caster wheel 17 mounted on a rearward extension 18 of the forward end of the plate 15 and which is disposed outwardly thereof. The sides 8 and 10 are supported by an inverted U-shaped frame member 19, the lower ends of the legs of which are pivotally connected to the plates 8 and 10, and the upper portion of said frame 19 is adapted to be connected by suitable means, not disclosed, to a tractor on which the cotton stripper is mounted, a portion of one wheel 20 of which is illustrated in Figure 1. The parts 8 to 20, inclusive, previously described correspond to the parts of the cotton stripper disclosed in Patent #1,950,902 and form no part of the present invention but have been illustrated and briefly described merely to better illustrate the mounting and operation of the cotton clearing attachment, designated generally 6.

The cotton clearing attachment 6 includes a bearing 21 which is fixed to the leg of the frame 19 which connects with the machine side 10 to provide a support and journal for a transversely disposed shaft 22 which is journalled therein and extends outwardly from the side 10 and inwardly from the plate 16. Thrust collars 23 are preferably adjustably secured on the shaft 22 to bear against opposite ends of the bearings 21 to retain the shaft against sliding movement through said bearing. A sprocket wheel 23 is fixed to the shaft 22 outwardly of the side 10 and a second sprocket wheel 25 is fixed to the shaft 11a. An endless chain 26 is trained over the sprocket wheels 24 and 25. The chain sprockets 13 and 14 are normally enclosed in a housing, not shown, disposed externally of the wall 10 and where such is provided, said housing will be slotted to accommodate the flights of the chain 26. Additionally, if desired, the sprocket wheel 24 may be provided with a slip clutch as disclosed in Patent #1,950,902 in connection with the sprocket wheel 75 thereof, so that the sprocket wheel 24 may slip relatively to the shaft 22 in the event that rotation of the shaft 22 is obstructed by large cotton stalks or plants passing through the machine 7.

A clearer member, designated generally 27, and best illustrated in Figure 4, includes an intermediate bar portion 28 from an outer side of which a hub or socket 29 projects and in which is received the opposite, inner end of the shaft 22. Said end of the shaft 22 is secured in the socket 29 by one or more fastenings 30. The shaft 22 and hub 29 combine to form a bearing for the clearer member. The clearer member 27 includes corresponding blades 31 and 32 which project from the ends of said intermediate portion 28 in opposite directions with respect to one another and which are inclined inwardly with respect to the machine 7 and in directions away from the socket 29, so that the blades 31 and 32 are each disposed at an obtuse angle to the plane of the intermediate portion 28. The leading edges 33 of the blades 31 and 32 are bevelled as seen at 34 adjacent to and toward the tapered tips 35 of the blades so that the tapered leading edge portions 34 extend backwardly toward the trailing edges of the blades from the inner to the outer ends thereof. The clearer or clearing member 27 is disposed between the plates 15 and 16 and the intermediate portion 28 thereof is disposed above the guide fingers 16a, as illustrated in Figure 2. However, the blades 31 and 32 are inclined away from the shaft 22 and the plate 16 so that the outer portions 34 and 35 of said blades will travel substantially over the space between the adjacent guide fingers 15a and 16a and through the space between the forward end of the stripper roll 9 and the wall 8 when the clearing member 27 is revolved. Accordingly, when the stripping machine 7 is operated in a conventional manner the shaft 22 will be driven in a counterclockwise direction as seen in Figures 1 and 3 by its chain and sprocket connection to the shaft 11a to cause the clearing member 27 to be revolved counterclockwise. Seed cotton which usually collects between the tapered forward end of the stripping roll 36 and the adjacent portion of the wall 8 will be thrown upwardly and rearwardly by the blade portions 34, 35 as said portions move upwardly and rearwardly into this space, thus preventing this cotton from falling through the machine and being wasted. It will be noted that the clearing member 27 is spaced from and to one side of the passage defined by the adjacent guide fingers 15a and 16a so that said clearing member will not interfere with larger cotton stalks passing through this throat and into a position to be engaged by the fingers 9a of the stripping roll 9. The clearing attachment 6 is primarily adapted for use in harvesting small or low cotton plants or the cotton therefrom and may be readily removed from the machine 7 when used for harvesting cotton of larger or taller plants.

Various modifications and changes are contemplated and may obviously be resorted to, without departing from the spirit or scope of the invention as hereinafter defined by the appended claim.

I claim as my invention:

A cotton harvesting machine comprising a mobile frame having a rotary stripper roll thereon, means in advance of said stripper roll providing a plant passageway leading to said stripper roll, a power operated rotatable clearer member intermediate of said stripper roll and said means, said clearer member being mounted on a substantially transversely disposed bearing positioned on one side of a vertical plane of said passageway, and said clearer member having blades extending from said bearing and into said passageway.

References Cited in the file of this patent

UNITED STATES PATENTS

| | | |
|---|---|---|
| 1,967,924 | Court | July 24, 1934 |
| 2,045,633 | Court | June 30, 1936 |
| 2,495,032 | Stuhl | Jan. 17, 1950 |
| 2,545,074 | Dielschneider | Mar. 13, 1951 |
| 2,564,586 | Smith et al. | Aug. 14, 1951 |
| 2,578,880 | Doyle | Dec. 18, 1951 |